United States Patent
Naito et al.

(10) Patent No.: US 10,179,853 B2
(45) Date of Patent: Jan. 15, 2019

(54) MATERIAL FOR FUSED DEPOSITION MODELING TYPE THREE-DIMENSIONAL MODELING, AND FILAMENT FOR FUSED DEPOSITION MODELING TYPE 3D PRINTING DEVICE

(71) Applicant: TORAY INDUSTRIES, INC., Tokyo (JP)

(72) Inventors: Yoshiyasu Naito, Ichihara (JP); Taeko Nito, Ichihara (JP); Masanori Kobayashi, Ichihara (JP); Takayuki Hase, Ichihara (JP); Katsuya Ogawa, Ichihara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 328 days.

(21) Appl. No.: 14/909,917

(22) PCT Filed: Sep. 9, 2014

(86) PCT No.: PCT/JP2014/073772
§ 371 (c)(1),
(2) Date: Feb. 3, 2016

(87) PCT Pub. No.: WO2015/037574
PCT Pub. Date: Mar. 19, 2015

(65) Prior Publication Data
US 2016/0177078 A1 Jun. 23, 2016

(30) Foreign Application Priority Data

Sep. 11, 2013 (JP) .................. 2013-187803
Apr. 11, 2014 (JP) .................. 2014-081503

(51) Int. Cl.
| | | |
|---|---|---|
| *B33Y 70/00* | (2015.01) | |
| *C08L 25/12* | (2006.01) | |
| *C08L 67/02* | (2006.01) | |
| *C08L 67/04* | (2006.01) | |
| *C08K 5/00* | (2006.01) | |
| *B29C 64/106* | (2017.01) | |
| *B29C 64/141* | (2017.01) | |
| *C08L 51/04* | (2006.01) | |
| *C08L 101/16* | (2006.01) | |
| *B33Y 10/00* | (2015.01) | |
| *B29K 25/00* | (2006.01) | |
| *B29K 67/00* | (2006.01) | |
| *B29K 105/00* | (2006.01) | |

(52) U.S. Cl.
CPC ............ *C08L 25/12* (2013.01); *B29C 64/106* (2017.08); *B29C 64/141* (2017.08); *B33Y 70/00* (2014.12); *C08K 5/0016* (2013.01); *C08L 67/02* (2013.01); *C08L 67/04* (2013.01); *B29K 2025/04* (2013.01); *B29K 2067/046* (2013.01); *B29K 2105/0038* (2013.01); *B29K 2105/0058* (2013.01); *B29K 2105/251* (2013.01); *B33Y 10/00* (2014.12); *C08L 51/04* (2013.01); *C08L 101/16* (2013.01)

(58) Field of Classification Search
CPC ........................ B29C 64/106; B29C 64/118
See application file for complete search history.

(56) References Cited

U.S. PATENT DOCUMENTS

| | | |
|---|---|---|
| 2002/0017743 A1 | 2/2002 | Priedeman, Jr. |
| 2008/0006966 A1 | 1/2008 | Mannella |
| 2008/0234754 A1* | 9/2008 | McCarthy ........ A61B 17/00491 606/298 |
| 2009/0295032 A1 | 12/2009 | Hopkins |
| 2010/0160505 A1 | 6/2010 | Kumazawa et al. |
| 2012/0296017 A1* | 11/2012 | Tsuboi .................... C08J 3/201 524/94 |
| 2013/0165601 A1* | 6/2013 | Takahashi .............. C08G 63/08 525/450 |
| 2013/0310502 A1 | 11/2013 | Naito et al. |
| 2014/0162033 A1 | 6/2014 | Giller |

FOREIGN PATENT DOCUMENTS

| | | |
|---|---|---|
| EP | 1561785 A1 | 8/2005 |
| EP | 1911807 A1 | 4/2008 |
| JP | 2007-051237 A | 3/2007 |

(Continued)

OTHER PUBLICATIONS

Translation of JP 2007-091872.*
Drummer et al., "Suitability of PLA/TCP for fused deposition modeling," Rapid Prototyping Journal, vol. 18, No. 6, Sep. 28, 2012, pp. 500-507 (10 pages total).
Extended European Search Report issued in European Application No. 14844814.5 dated Jun. 28, 2017.
International Search Report issued in PCT/JP2014/073772 dated Oct. 14, 2014.
Written Opinion of the International Searching Authority issued in PCT/JP2014/073772 dated Oct. 14, 2014.

*Primary Examiner* — Peter L Vajda
(74) *Attorney, Agent, or Firm* — Birch, Stewart, Kolasch & Birch, LLP

(57) ABSTRACT

[Problem] To provide a material for fused-deposition-type three-dimensional modeling whereby a warp-free modeled object is obtained without devising a modeling shape and without installing a special apparatus as a 3D printer device, and whereby a modeled article having flexibility as well as excellent surface polishing properties is obtained. [Solution] A material for fused-deposition-type three-dimensional modeling, obtained by blending 10-900 parts by weight of a styrene-based resin (B1) obtained by copolymerization of an aromatic vinyl-monomer (b1) and a cyanated vinyl-monomer (b2), and/or 5-400 parts by weight of a thermoplastic resin (B2) having a glass transition temperature of 20° C. or lower and/or 5-30 parts by weight of a plasticizer (B3), with respect to 100 parts by weight of a polylactic resin (A).

11 Claims, No Drawings

(56) References Cited

FOREIGN PATENT DOCUMENTS

| | | | | |
|---|---|---|---|---|
| JP | 2007-091872 | * | 4/2007 | ............. C08L 67/04 |
| JP | 2007-091872 A | | 4/2007 | |
| JP | 2012-233200 A | | 11/2012 | |
| WO | WO 2008/008116 A1 | | 1/2008 | |
| WO | WO 2008/112061 A1 | | 9/2008 | |
| WO | WO 2012/058278 A2 | | 5/2012 | |
| WO | WO 2012/111587 A1 | | 8/2012 | |

* cited by examiner

MATERIAL FOR FUSED DEPOSITION MODELING TYPE THREE-DIMENSIONAL MODELING, AND FILAMENT FOR FUSED DEPOSITION MODELING TYPE 3D PRINTING DEVICE

TECHNICAL FIELD

The present invention relates to a material for fused deposition modeling type three-dimensional modeling, and a filament for a 3D printing device using the same.

BACKGROUND ART 3D printing technology, by which a material for modeling is three-dimensionally placed and modeled on the basis of CAD (computer aided design) data, is known. One of such methods is a fused deposition molding method (FDM method), in which a filament-shaped material for modeling (modeling material) is heated and melted, extruded through a nozzle, and modeled while being stacked on a building table. Such 3D printing technology can enable modeling in a shape or size which cannot be performed by conventional injection molding, and it does not require a mold for molding molten resin, and therefore it is believed to be very beneficial for, e.g., producing industrial parts having a new shape and designing in a stage before production.

In recent years, 3D printing devices (also called 3D printers) employing the FDM method have been reduced in size and are available at low prices and thus they have been spreading to common households and educational facilities including elementary schools and junior high schools. Moreover, use of objects obtained using 3D printing devices are under expansion to multiple purposes, such as display samples, decoration, figurines, and figures.

As a three-dimensionally modeling method using the FDM method, there has been proposed, for example, a method of modeling a 3D object containing a metal part, including positioning a metal part having a polymer-coated surface within a build chamber, and depositing a build material on the polymer-coated surface (see, for example, Patent Document 1). On the other hand, there has been proposed, for example, a method including feeding a filament of a modified ABS (ABS: acrylonitrile butadiene styrene copolymer) material to an extrusion head at the maximum liquefier temperature to melt it, and depositing the molten modified ABS material (see, for example, Patent Document 2).

As a material for three-dimensionally modeling using the FDM method, there has been proposed, for example, a composition including a copolymer obtained by graft copolymerizing an aromatic vinyl compound in the presence of a specific rubbery polymer and a polymer obtained by polymerizing an aromatic vinyl compound (see, for example, Patent Document 3). Moreover, resins such as acrylonitrile-butadiene-styrene, polyamide, polycarbonate, and polylactide, and combinations thereof are disclosed (see, for example, Patent Document 4).

PRIOR ART DOCUMENTS

Patent Documents

Patent Document 1: WO 2008/8116 A
Patent Document 2: WO 2008/112061 A
Patent Document 3: JP-A-2007-51237
Patent Document 4: WO 2012/058278 A

SUMMARY OF THE INVENTION

Problems to be Solved by the Invention

However, when a crystalline resin such as a polyamide resin is used as a material to be used for the FDM method, or when the composition including a copolymer obtained by graft copolymerizing an aromatic vinyl compound in the presence of a specific rubbery polymer and a polymer obtained by polymerizing an aromatic vinyl compound disclosed in Patent Document 3 is used, or when a crystalline resin such as the polyamide resin disclosed in Patent Document 4 is used, or when a resin having a high glass transition temperature such as the polycarbonate resin is used, there is a problem that warpage is likely to occur in an object.

Although remedies such as making the temperature of the atmosphere for modeling by the FDM method higher than room temperature have been taken against this problem, materials less likely to develop warpage have been demanded.

On the other hand, use of a polylactic acid resin as a material to be used for the FDM method can inhibit warpage, but a person may get hurt by a fractured section or the like because the material is hard and brittle. Moreover, it is difficult to polish a resulting modeled article and resin fragments remain on a surface, and thus there is a problem that a beautiful modeled article cannot be obtained.

Thus, the main purpose of the present invention is to provide a material for fused deposition modeling type three-dimensional modeling that develops little warpage and is easy to polish a surface, as a material for modeling to be used for the FDM method.

Solutions to the Problems

As a result of earnest research for solving the above-described problems, the inventors have accomplished the present invention by finding that the above-described problems can be solved by blending 10 to 900 parts by weight of a styrene-based resin (B1) obtained by copolymerizing an aromatic vinyl-based monomer (b1) and a vinyl cyanide-based monomer (b2), and/or 5 to 400 parts by weight of a thermoplastic resin (B2) the glass transition temperature of which is 20° C. or lower, and/or 5 to 30 parts by weight of a plasticizer (B3) relative to 100 parts by weight of a polylactic acid resin (A).

Specifically, the material for fused deposition modeling type three-dimensional modeling of the present invention has the following configurations:

(1): A material for fused deposition modeling type three-dimensional modeling obtained by blending 10 to 900 parts by weight of a styrene-based resin (B1) obtained by copolymerizing an aromatic vinyl-based monomer (b1) and a vinyl cyanide-based monomer (b2), and/or 5 to 400 parts by weight of a thermoplastic resin (B2) the glass transition temperature of which is 20° C. or lower, and/or 5 to 30 parts by weight of a plasticizer (B3) relative to 100 parts by weight of a polylactic acid resin (A).

(2): The material for fused deposition modeling type three-dimensional modeling as set forth in (1), wherein the optical purity of the polylactic acid resin (A) is 97% or less.

(3): The material for fused deposition modeling type three-dimensional modeling as set forth in (1) or (2), wherein the thermoplastic resin (B2) includes a copolymerized polyester resin.

(4): The material for fused deposition modeling type three-dimensional modeling as set forth in any one of (1) to (3), wherein the material includes the styrene-based resin (B1) and the thermoplastic resin (B2) having a glass transition temperature of 20° C. or lower and the thermoplastic resin (B2) includes a thermoplastic elastomer.
(5): The material for fused deposition modeling type three-dimensional modeling as set forth in any one of (1) to (4), wherein the plasticizer (B3) includes an ester-based plasticizer and/or a polyalkylene glycol-based plasticizer.
(6): The material for fused deposition modeling type three-dimensional modeling as set forth in any one of (1) to (5), wherein the material obtained by further blending an epoxy group-containing compound (C).
(7): A filament, particle or pellet for a fused deposition modeling type 3D printing device obtained by molding the material for fused deposition modeling type three-dimensional modeling as set forth in any one of (1) to (6).
(8): A modeled article obtained by modeling the filament, particle or pellet for a fused deposition modeling type 3D printing device as set forth in (7).
(9): A method for producing a filament, particle or pellet for a fused deposition modeling type 3D printing device including a step of obtaining a filament, particle or pellet by molding the material as set forth in any one of (1) to (6).
(10): A method for producing a modeled article including a step of obtaining a modeled article using the filament, particle or pellet as set forth in (7) or a filament, particle or pellet produced by the production method as set forth in (9) in a fused deposition modeling type 3D printing device.
(11): Use of the material as set forth in any one of (1) to (6) for producing a filament, particle or pellet to be used for producing a modeled article using a fused deposition modeling type 3D printing device.
(12): Use of the filament, particle or pellet as set forth in (7) or a filament, particle or pellet produced by the production method as set forth in (9) for producing a modeled article by using a fused deposition modeling type 3D printing device.

Effects of the Invention

According to the present invention, a modeled article being small in warpage can be obtained using a material for modeling obtained by blending 10 to 900 parts by weight of a styrene-based resin (B1) obtained by copolymerizing an aromatic vinyl-based monomer (b1) and a vinyl cyanide-based monomer (b2), and/or 5 to 400 parts by weight of a thermoplastic resin (B2) having a glass transition temperature of 20° C. or lower and/or 5 to 30 parts by weight of a plasticizer (B3) relative to 100 parts by weight of a polylactic acid resin (A).

EMBODIMENTS OF THE INVENTION

The material for fused deposition modeling type three-dimensional modeling (hereinafter sometimes referred to as material for modeling) of the present invention is described concretely below.

The material for modeling of the present invention is preferably obtained by blending (including) one or more selected from the group consisting of a styrene-based resin (B1) obtained by copolymerizing an aromatic vinyl-based monomer (B1) and a vinyl cyanide-based monomer (b2), a thermoplastic resin (B2) having a glass transition temperature of 20° C. or lower, and a plasticizer (B3).

The material for modeling of the present invention is preferably a material for modeling satisfying any one or more of the following [Condition 1] to [Condition 3] in addition to the above-mentioned condition.

[Condition 1] A styrene-based resin (B1) obtained by copolymerizing an aromatic vinyl-based monomer (b1) and a vinyl cyanide-based monomer (b2) and a polylactic acid resin (A) are blended (contained), and the loading (content) of the styrene-based resin (B1) is 10 parts by weight to 900 parts by weight relative to 100 parts by weight of the content of the polylactic acid resin (A).

[Condition 2] A polylactic acid resin (A) and a thermoplastic resin (B2) having a glass transition temperature of 20° C. or lower are blended (contained), and the loading (content) of the thermoplastic resin (B2) having a glass transition temperature of 20° C. or lower is 5 parts by weight to 400 parts by weight relative to 100 parts by weight of the content of the polylactic acid resin (A).

[Condition 3] A polylactic acid resin (A) and a plasticizer (B3) are blended (contained), and the loading (content) of the plasticizer (B3) is 5 parts by weight to 30 parts by weight relative to 100 parts by weight of the content of the polylactic acid resin (A).

Therefore, the material for fused deposition modeling type three-dimensional modeling of the present invention is particularly preferably a material for fused deposition modeling type three-dimensional modeling obtained by blending 10 to 900 parts by weight of a styrene-based resin (B1) obtained by copolymerizing an aromatic vinyl-based monomer (b1) and a vinyl cyanide-based monomer (b2), and/or 5 to 400 parts by weight of a thermoplastic resin (B2) having a glass transition temperature of 20° C. or lower, and/or 5 to 30 parts by weight of a plasticizer (B3) relative to 100 parts by weight of a polylactic acid resin (A).

(Polylactic Acid Resin (A))

The material for modeling of the present invention is obtained by blending a styrene-based resin (B1), a thermoplastic resin (B2) having a glass transition temperature of 20° C. or lower, or a plasticizer (B3), each described below, with a polylactic acid resin (A). A material for modeling capable of being molded at lower temperatures can be obtained by blending the polylactic acid resin (A).

Generally, one conceivable method for molding at a low temperature and lowering a melt viscosity may be a method of blending a thermoplastic resin having a low glass transition temperature (Tg) (e.g., a Tg lower than the glass transition temperature (Tg) of the styrene-based resin (B1) described below (approximately 100 to 110° C.)). Examples of known thermoplastic resins being commercially widely distributed and available at a relatively low price and being lower in Tg than the styrene-based resin (B1) include nylon 6 (PA6) (Tg is approximately 50° C.), nylon 66 (PA66) (Tg is approximately 50° C.), polyethylene terephthalate (PET) (Tg is approximately 80° C.), and polybutylene terephthalate (PBT) (Tg is approximately 22 to 30° C.). Such a thermoplastic resin, however, readily crystallizes and the melting point (Tm) thereof is equal to or higher than 200° C., and in order to melt such a thermoplastic resin sufficiently, it is necessary to perform heating at 220° C. or more.

The polylactic acid resin (A) in the present invention is a polymer including L-lactic acid (L-form) and/or D-lactic acid (D-form) as a main constituent. The term "main constituent" as used herein means any constituent occupying 50 mol % or more of all constituents. The polymer contains L-lactic acid and/or D-lactic acid preferably in an amount of 70 mol % or more, more preferably in an amount of 90 mol % or more, relative to all the constituents.

Especially, from the viewpoint of mechanical properties, it is preferable to use a polylactic acid resin including L-form or D-form in a content of 80% (mol %) or more of all lactic acid components of the polylactic acid resin (A), and the L-form or D-form content is more preferably 85% or more.

On the other hand, while the upper limit of the content of L-lactic acid or D-lactic acid, which is a constituent of the polylactic acid resin (A), is not particularly limited, it is preferably 99% (mol %) or less, more preferably 97% or less from the viewpoint of reducing optical purity and suppressing the advance of crystallization. The optical purity of the polylactic acid resin (A) is particularly preferably 97% or less.

From the viewpoint of moldability, the upper limit of the content of the L-form or the D-form is preferably 98% (mol %) or less, more preferably 97% or less, even more preferably 96% or less, most preferably 95% or less. Warpage can be suppressed by suppressing crystallization.

The polylactic acid resin (A) may be one in which another copolymerization component other than lactic acid has been copolymerized as long as the object of the present invention is not impaired. Examples of such another copolymerization components include polyvalent carboxylic acids, polyhydric alcohols, hydroxycarboxylic acids, and lactones. Specific examples include polyvalent carboxylic acids, such as oxalic acid, malonic acid, succinic acid, glutaric acid, adipic acid, azelaic acid, sebacic acid, dodecanedioic acid, fumaric acid, cyclohexanedicarboxylic acid, terephthalic acid, isophthalic acid, phthalic acid, 2,6-naphthalenedicarboxylic acid, 5-sodiumsulfoisophthalic acid, and 5-tetrabutylphosphoniumsulfoisophthalic acid; polyhydric alcohols, such as ethylene glycol, propylene glycol, butanediol, heptanediol, hexanediol, octanediol, nonanediol, decanediol, 1,4-cyclohexanedimethanol, neopentyl glycol, glycerol, trimethylolpropane, pentaerythritol, bisphenol A, an aromatic polyhydric alcohol prepared by making ethylene oxide undergo addition reaction to bisphenol A, diethylene glycol, triethylene glycol, polyethylene glycol, polypropylene glycol, and polytetramethylene glycol; hydroxycarboxylic acids, such as glycolic acid, 3-hydroxybutyric acid, 4-hydroxybutyric acid, 4-hydroxyvaleric acid, 6-hydroxycaproic acid, and hydroxybenzoic acid; lactones, such as glycolide, ε-caprolactone glycolide, ε-caprolactone, β-propiolactone, δ-butyrolactone, β- or γ-butyrolactone, pivalolactone, and δ-valerolactone. One or two or more of such copolymerization components may be used.

The polylactic acid resin (A) to be used for the material for fused deposition modeling type three-dimensional modeling according to embodiments of the present invention is a polymer including L-lactic acid and/or D-lactic acid as main constituents, and it can contain another copolymerization component other than lactic acid. Examples of such other copolymerization units include units formed from polyvalent carboxylic acids, such as the aforementioned polyvalent carboxylic acids and anthracenedicarboxylic acid, the aforementioned polyhydric alcohols, the aforementioned hydroxycarboxylic acids, and the aforementioned lactones. Usually, the content of such copolymerization units is preferably 0 to 30 mol %, more preferably 0 to 10 mol % where the amount of all monomer units is taken as 100 mol %.

It is also preferable to use a polylactic acid resin in combination such that an L-form or D-form content of 80% or more is achieved.

The polylactic acid resin (A) to be used in an embodiment of the present invention may be a modified resin and, for example, use of a maleic anhydride-modified polylactic acid resin, an epoxy-modified polylactic acid resin, an amine-modified polylactic acid resin, or the like is a preferred embodiment because not only heat resistance but also mechanical properties are thereby improved.

As a method for producing the polylactic acid resin (A) in an embodiment of the present invention, there can be used a polymerization method known in the art, examples of which include a direct polymerization method from lactic acid and a ring-opening polymerization method via a lactide.

The polylactic acid resin (A) in an embodiment of the present invention is not particularly limited with respect to its molecular weight and molecular weight distribution, and the weight average molecular weight thereof is preferably 100,000 or more, more preferably 150,000 or more, most preferably 180,000 or more. From the viewpoint of flowability during molding, the upper limit of the weight average molecular weight is preferably 400,000 or less. The weight average molecular weight as used herein is a polymethyl methacrylate (PMMA)-equivalent weight average molecular weight measured by gel permeation chromatography (GPC).

Although the polylactic acid resin (A) is not particularly limited with respect to its molecular weight and molecular weight distribution as long as it is substantially moldable as described above, the polylactic acid resin (A) is known to undergo its thermal decomposition self-catalytically by a carboxyl group located at an end of its molecule, and from the viewpoint of inhibition of the thermal decomposition, the weight average molecular weight is preferably 50,000 or more, more preferably 100,000 or more. On the other hand, from the viewpoint of enabling the material for modeling to be molded at lower temperatures and further lowering the melt viscosity, the weight average molecular weight is preferably 400,000 or less, more preferably 300,000 or less, even more preferably 200,000 or less (as described above, the weight average molecular weight as used herein is a polymethyl methacrylate (PMMA)-equivalent weight average molecular weight measured by gel permeation chromatography (GPC) using hexafluoroisopropanol as a solvent).

(Styrene-Based Resin (B1))

The styrene-based resin (B1) to be used in an embodiment of the present invention denotes a copolymer obtained by copolymerizing at least an aromatic vinyl-based monomer (b1) and a vinyl cyanide-based monomer (b2). Moreover, it also may be a copolymer obtained by further copolymerizing an alkyl unsaturated carboxylate-based monomer (b3) and/or another vinyl-based monomer (b4) copolymerizable therewith according to need. Use of the styrene-based resin (B1) makes it possible to obtain a material capable of affording a modeled article excelling in surface polishability.

The styrene-based resin (B1) can be obtained by subjecting a monomer mixture including an aromatic vinyl-based monomer (b1) and a vinyl cyanide-based monomer (b2) and, according to need, an alkyl unsaturated carboxylate-based monomer (b3) and/or another vinyl-based monomer (b4) copolymerizable therewith to bulk polymerization, bulk suspension polymerization, solution polymerization, precipitation polymerization or emulsion polymerization each known in the art.

The aromatic vinyl-based monomer (b1) is not particularly limited, and specific examples thereof include styrene, α-methylstyrene, o-methylstyrene, p-methylstyrene, c-ethylstyrene, p-ethylstyrene, and p-t-butylstyrene. Especially, styrene or α-methylstyrene is preferably used. These may be used individually or in combination. The monomer components constituting the styrene-based resin (B1) contain the aromatic vinyl-based monomer (b1) preferably in a content of 20% by weight or more, more preferably in a content of 50% by weight or more.

There is no particular limitation with respect to the vinyl cyanide-based monomer (b2), and specific examples thereof include acrylonitrile, methacrylonitrile and ethacrylonitrile. Especially, acrylonitrile is preferably used. These may be used individually or in combination.

From the viewpoint of improving the productivity and the mechanical strength of a filament to be obtained using a material for modeling, the monomer components constituting the styrene-based resin (B1) contain the vinyl cyanide-based monomer (b2) preferably in a content of 15% by weight or more, more preferably in a content of 20% by weight or more.

There is no particular limitation with respect to the alkyl unsaturated carboxylate-based monomer (b3), an ester of an alcohol having 1 to 6 carbon atoms and (meth)acrylic acid is suitable. Such an ester may further have a substituent and examples of such a substituent include a hydroxy group and chlorine. Specific examples of the alkyl unsaturated carboxylate-based monomer (b3) include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, and 2,3,4,5-tetrahydroxypentyl (meth)acrylate. Especially, methyl methacrylate is preferably used. These may be used individually or in combination. The term "(meth)acrylic acid" as used herein denotes acrylic acid or methacrylic acid.

The other vinyl-based monomer (b4) has no particular limitations as long as it can be copolymerized with the aromatic vinyl-based monomer (b1), the vinyl cyanide-based monomer (b2) and, according to need, the alkyl unsaturated carboxylate-based monomer (b3), and specific examples thereof include maleimide-based monomers, such as N-methylmaleimide, N-ethylmaleimide, N-cyclohexylmaleimide, and N-phenylmaleimide, vinyl-based monomers having a carboxyl group or a carboxylic anhydride group, such as acrylic acid, methacrylic acid, maleic acid, monoethyl maleate, maleic anhydride, phthalic acid, and itaconic acid, vinyl-based monomers having a hydroxy group, such as 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, and 4,4-dihydroxy-2-butene, vinyl-based monomers having an amino group or its derivative, such as acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallyl amine, N-methylallylamine, and p-aminostyrene, and vinyl-based monomers having an oxazoline group, such as 2-isopropenyl-oxazoline, 2-vinyloxazoline, 2-acryloyl-oxazoline, and 2-styryl-oxazoline. These may be used individually or in combination.

While there is no particular limitation with the molecular weight of the styrene-based resin (B1), from the viewpoint of securing extrusion stability at the time of producing a filament obtained using a material for modeling and mechanical strength necessary for collecting a filament by winding it around a bobbin, the weight average molecular weight is preferably 50,000 or more, more preferably 80,300 or more. On the other hand, from the viewpoint of further lowering the melt viscosity at low temperatures of a filament obtained using a material for modeling, the weight average molecular weight is preferably 400,000 or less. The weight average molecular weight as referred to herein denotes a polystyrene-equivalent weight average molecular weight measured by GPC using tetrahydrofuran as a solvent.

Specific examples of the styrene-based resin (B1) to be used in the present invention include acrylonitrile-styrene (AS) resin and methyl methacrylate-acrylonitrile-styrene (MAS) resin. Two or more of them may be used in combination: for example, AS resin and MAS resin may be used in combination.

The loading of the styrene-based resin (B1) in the material for modeling of the present invention is 10 to 900 parts by weight relative to 100 parts by weight of the polylactic acid resin (A). When the loading of the styrene-based resin (B1) is less than 10 parts by weight, the surface polishability of a 3D modeled article is insufficient, and when the loading of the styrene-based resin (B1) exceeds 900 parts by weight, the warpage becomes greater. The loading of the styrene-based resin (B1) is preferably 30 parts by weight or more, more preferably 100 parts by weight or more. On the other hand, the loading of the styrene-based resin (B1) is preferably 300 parts by weight or less, more preferably 250 parts by weight or less.

There is no particular limitation with respect to the loading of the polylactic acid resin (A) in the material for modeling of the present invention as long as it is within the range of the present invention, and the loading can be adjusted as occasion calls according to the use method and the use environment of a modeled article obtained using a material for modeling obtained. For example, when paint or the like is applied to a modeled article, the loading of the polylactic acid resin (A) in the material for modeling to be used for such a modeled article is preferably 50 parts by weight or less relative to 100 parts by weight in total of the styrene-based resin (B1) and the polylactic acid resin (A) because the styrene-based resin (B1) excels in paintability. Moreover, when a modeled article is displayed in a vehicle, the modeled article preferably has a heat distortion temperature of about 80° C., and the loading of the polylactic acid resin (A) in the material for modeling to be used for such a modeled article is preferably 30 parts by weight or less relative to 100 parts by weight in total of the styrene-based resin (B1) and the polylactic acid resin (A). On the other hand, from the viewpoint of enabling molding at lower temperatures, the loading of the polylactic acid resin (A) is preferably adjusted to 5 parts by weight or more relative to 100 parts by weight in total of the styrene-based resin (B1) and the polylactic acid resin (A).

Next, an effect produced by a material for fused deposition modeling type three-dimensional modeling obtained by compounding a styrene-based resin (B1) obtained by copolymerizing an aromatic vinyl-based monomer (b1) and a vinyl cyanide-based monomer (b2) and a polylactic acid resin (A) is described.

First, as a material for three-dimensional modeling using the FDM method, a composition including an amorphous thermoplastic resin selected from the group consisting of a blend of polyphenylene ether and impact-resistant polystyrene, a blend of polyphenylsulfone and amorphous polyamide, and a blend of polyphenylsulfone, polysulfone, and amorphous polyamide (see, for example, WO 2002/093360), a composition composed of a copolymer obtained by graft-copolymerizing an aromatic vinyl compound in the presence of a specific rubbery polymer and a polymer obtained by polymerizing an aromatic vinyl compound (see, for example, JP-A-2007-51237), and the like have been proposed.

Generally, in a three-dimensionally modeling method using the FDM method, stacking such a material for modeling to become smooth and flattened on a building table requires reduction in melt tension and therefore it is necessary to heat a filament formed from the material for modeling such that the melt viscosity falls within a proper range. Although the material for modeling disclosed in WO 2002/093360 A excels in mechanical strength and the resin composition disclosed in JP-A-2007-51237 excels additionally in thermal stability, in order to melt these materials for modeling to attain a proper melt viscosity, high heating temperature is required.

On the other hand, 3D printing devices adopting the FDM method have been spreading to common households or educational facilities as described previously. Moreover, properties required with modeled articles themselves have been changing and high mechanical strength which has conventionally been required may not be required.

Thus, it is preferable that a material for modeling can be melted at a lower temperature than the material for modeling proposed in WO 2002/093360 A or JP-A-2007-51237 and, as a result, electric power consumption or gas emitted from a material for modeling can be reduced.

When such a property is required, the material for three-dimensional modeling of the present invention preferably incorporates a styrene-based resin (B1) produced by copolymerizing an aromatic vinyl-based monomer (b1) and a vinyl cyanide-based monomer (b2), and a polylactic acid resin (A).

When a modeled article is produced with a 3D printing device using the FDM method using a material for fused deposition modeling type three-dimensional modeling prepared by mixing a styrene-based resin (B1) and a polylactic acid resin (A) (or a filament, particle, or pellet prepared by molding the material), it is possible to produce a modeled article at a lower temperature than the material for modeling proposed in WO 2002/093360, JP-A-2007-51237 or the like.

While the polylactic acid resin (A) is a crystalline resin, it has little progress of crystallization in the absence of a nucleating agent or auxiliary agent that promotes crystallization, and the Tg of the polylactic acid resin (A) is generally 55 to 60° C., which is generally lower than the Tg of the styrene-based resin (B1). Incorporation of the polylactic acid resin (A) having such a characteristic into the styrene-based resin (B1) can, for example, enable molding at lower temperatures than a case of using ABS as a material for modeling.

A material for fused deposition modeling type three-dimensional modeling obtained by compounding a styrene-based resin (B1) and a polylactic acid resin (A), and a filament, particle or pellet for a 3D printing device using the same are lower in melt viscosity than conventional materials for modeling proposed in WO 2002/093360, JP-A-2007-51237, etc., and thus, they can be molded at lower temperature than such materials for modeling. For this reason, compared with these materials for modeling, the electric power consumption required by modeling and the gas emitted from a material for modeling may be reduced successfully. Due to such effects, 3D printing devices can be spread more for common households and educational facilities.

(Thermoplastic Resin (B2) the Glass Transition Temperature of which is 20° C. or Lower)

As the thermoplastic resin (B2) the glass transition temperature of which is 20° C. or lower to be used in an embodiment of the present invention, polyester, thermoplastic elastomer, a graft copolymer prepared by graft polymerizing a monomer mixture component described below to a thermoplastic elastomer, etc. can be used. In the present invention, the "polyester" is a general term including aliphatic polyester resin, aliphatic aromatic polyester resin, alicyclic polyester resin, and aromatic polyester.

Use of the thermoplastic resin (B2) the glass transition temperature of which is 20° C. or lower makes it possible to obtain a material capable of affording a modeled article than develops little warpage and excels in surface polishability. Moreover, the use of (B2) can increase the mechanical strength of a filament and a modeled article obtained using a material for modeling because the impact strength of the material for modeling is enhanced and the softness is increased thereby. The filament obtained using a material for modeling is generally discharged through a hole provided in the head of an extruder and collected by winding around a bobbin, and the breakage thereof at the time of winding around the bobbin can be inhibited through improvement in mechanical strength. Moreover, it can improve ease-of-use of 3D printing device users and safety can also be improved because the filament itself is made resistant to breakage and even if the filament is broken, the fractured section has a low tendency to be sharp. Furthermore, the machinability of a modeled article can be improved through the improvement in mechanical strength of the modeled article, and it becomes easier to polish the surface thereof with a scraper or the like in order to smoothen the surface and fracture in processing with a drill or the like can be inhibited.

Examples of the aliphatic polyester resin include polyethylene succinate, polybutylene succinate, polybutylene adipate, polyethylene adipate, polybutylene (succinate/adipate), polyethylene (succinate/adipate), polyhydroxy butyrate, and polyhydroxy (butyrate/hexanoate). Herein "/" means copolymerization.

Examples of the aliphatic aromatic polyester resin include polybutylene (terephthalate/succinate), polyethylene (terephthalate/succinate), polybutylene (terephthalate/adipate), polyethylene (terephthalate/adipate), polyethylene (terephthalate/sulfoisophthalate), polybutylene (terephthalate/sebacate), and polyethylene (terephthalate/sebacate).

As the thermoplastic resin (B2) the glass transition temperature of which is 20° C. or lower, use of at least one selected from copolymerized polyester resins and thermoplastic elastomers is preferable from the viewpoint of low warpage of a 3D modeled article.

Of the polyester resins provided as examples previously, examples of the copolymerized polyester resin include polybutylene (succinate/adipate), polyethylene (succinate/adipate), polyhydroxy(butyrate/hexanoate), polybutylene (terephthalate/succinate), polyethylene (terephthalate/succinate), polybutylene (terephthalate/adipate), polyethylene (terephthalate/adipate), polyethylene (terephthalate/sulfoisophthalate), polybutylene (terephthalate/sebacate), and polyethylene (terephthalate/sebacate).

As the thermoplastic elastomer to be used in an embodiment of the present invention, any of a (co)polymer, a random copolymer, a block copolymer, and a graft copolymer can be used.

Examples of said (co)polymer, random copolymer, and block copolymer include an ethylene-propylene copolymer, an ethylene-propylene-nonconjugated diene copolymer, an ethylene-butene-1 copolymer, acrylic rubbers, an ethylene-acrylic acid copolymer and its alkali metal salts (so-called ionomer), an ethylene-glycidyl (meth)acrylate copolymer, an ethylene-alkyl (meth)acrylate copolymer (for example, an ethylene-methyl acrylate copolymer, an ethylene-ethyl acrylate copolymer, an ethylene-butyl acrylate copolymer, and an ethylene-methyl methacrylate copolymer), an ethylene-vinyl acetate copolymer, an acid-modified ethylene-propylene copolymer, diene rubber (for example, polybutadiene, polyisoprene, and polychloroprene), a copolymer of diene with a vinyl monomer (for example, a styrene-butadiene random copolymer, a styrene-butadiene block copolymer, a styrene-butadiene-styrene block copolymer, a styrene-isoprene random copolymer, a styrene-isoprene block copolymer, a styrene-isoprene-styrene block copolymer, a styrene-ethylene-butylene-styrene block copolymer, a styrene-ethylene-propylene-styrene block copolymer, and a butadiene-acrylonitrile copolymer) or its hydrogenated product, polyisobutylene, a copolymer of isobutylene with butadiene or isoprene, natural rubber, thiokol rubber, polysulfide rubber, silicone rubber, polyurethane rubber, polyether rubber, epichlorohydrin rubber, polyester-based elastomer, or polyamide-based elastomer. Moreover, polymers crosslinked with various crosslinkers, polymers having various microstructures, e.g., cis-structure and trans-structure, and a multilayer structure polymer composed of a core layer and one or more shell layers covering the core layer can also be used.

In producing such a (co)polymer, a random copolymer, and a block copolymer, such monomers as other olefins, dienes, acrylic acid, alkyl unsaturated carboxylate-based monomer (b3) (particularly preferably, an acrylate or a methacrylate) may be copolymerized. Of these thermoplastic elastomers, a polymer including acrylic units and a polymer including units having an acid anhydride group and/or a glycidyl group are preferable. Particularly preferable examples of the acrylic unit include a methyl methacrylate unit, a methyl acrylate unit, an ethyl acrylate unit, or a butyl acrylate unit, and preferable examples of the unit having an acid anhydride group or a glycidyl group include a maleic anhydride unit or a glycidyl methacrylate unit.

Examples of the graft copolymer to be used in the present invention include a product obtained by graft polymerizing a monomer mixed component including an aromatic vinyl-based monomer (b1) and a vinyl cyanide-based monomer (b2) to a rubbery polymer (r).

Such a graft copolymer can be obtained, for example, by subjecting a monomer mixed component including an aromatic vinyl-based monomer (b1) and a vinyl cyanide-based monomer (b2) to bulk polymerization, bulk suspension polymerization, solution polymerization, precipitation polymerization, or emulsion polymerization known in the art, in the presence of a rubber polymer (r). The graft copolymer can include not only a graft copolymer in which monomer components are graft polymerized to a rubbery polymer (r) but also a polymer of monomer components not having been grafted to a rubbery polymer (r). The monomer components to be graft polymerized include at least an aromatic vinyl-based monomer (b1) and a vinyl cyanide-based monomer (b2) and, according to need, an alkyl unsaturated carboxylate-based monomer (b3) and another vinyl-based monomer (b4) copolymerizable therewith. Examples of the aromatic vinyl-based monomer (b1), the vinyl cyanide-based monomer (b2), the alkyl unsaturated carboxylate-based monomer (b3), and another vinyl-based monomer (b4) copolymerizable therewith include those provided as examples of the monomers that constitute the styrene-based resin (B1).

When the styrene-based resin (B1) and the graft copolymer described above are mixed in the present invention, it is preferable to use the same monomer component in the same mixing ratio as those of the styrene-based resin (B1) as the monomer component to be graft polymerized from the viewpoint of dispersing the styrene-based resin (B1) and the graft copolymer more uniformly and thereby improving the appearance of a material for modeling, and a filament and a modeled article obtained using the material.

Although there is no particular limitation with the rubbery polymer (r), one the glass transition temperature of which is 0° C. or less is preferred, and diene rubber, acrylic rubber, ethylene rubber, etc. can suitably be used. Specific examples include polybutadiene, a styrene-butadiene copolymer, a styrene-butadiene block copolymer, an acrylonitrile-butadiene copolymer, a butyl acrylate-butadiene copolymer, polyisoprene, a butadiene-methyl methacrylate copolymer, a butyl acrylate-methyl methacrylate copolymer, a butadiene-ethyl acrylate copolymer, an ethylene-propylene copolymer, an ethylene-isoprene copolymer, and an ethylene-methyl acrylate copolymer.

Of these rubbery polymers, polybutadiene, a styrene-butadiene copolymer, a styrene-butadiene block copolymer, and an acrylonitrile-butadiene copolymer are preferably used from the viewpoint of improving mechanical strength more. These rubbery polymers can be used individually or in combination.

The weight average particle diameter of the rubbery polymer (r), which is not particularly limited, is preferably within the range of 0.05 to 1.0 μm, more preferably within the range of 0.1 to 0.5 μm. By adjusting the weight average particle diameter of the rubbery polymer into the range of 0.05 μm to 1.0 μm, it is possible to increase mechanical strength at a smaller loading and also possible to inhibit increase in melt viscosity. Herein the weight average particle diameter of the rubbery polymer (r) can be measured by the sodium alginate method disclosed in "Rubber Age, Vol. 88, p. 484-490, (1960), by E. Schmidt, P. H. Biddison," namely, a method of determining a particle diameter at a 50% cumulative weight fraction from the cumulative weight fraction of sodium alginate concentration and a creamed weight ratio using the fact that the diameter of polybutadiene particles that cream varies depending upon the concentration of sodium alginate.

Although the gel content of the rubbery polymer (r) is not particularly limited, it is preferably 40 to 99% by weight, more preferably 60 to 95% by weight, particularly preferably 70 to 90% by weight from the viewpoint of increasing impact strength. Herein the gel content can be measured by a method of determining the amount in % by weight of insolubles obtained by extraction at room temperature for 24 hours using toluene.

As described previously, the graft copolymer is a material including, in addition to a graft copolymer having a structure in which a monomer mixed component including an aromatic vinyl-based monomer (b1) and a vinyl cyanide-based monomer (b2) are graft polymerized to a rubbery polymer (r), a polymer of monomer components not having been grafted to the rubbery polymer (r). The degree of grafting of the graft copolymer, which is not particularly limited, is preferably 10 to 100% by weight, particularly preferably 30 to 70% by weight from the viewpoint of increasing mechanical strength. Herein the degree of grafting is a value calculated from the following formula.

Degree of grafting (%)=[<the amount (weight) of vinyl-based copolymer graft polymerized to rubbery polymer>/<the rubber content (weight) of graft copolymer>]×100.

The rubber content referred to herein is the content of a rubbery polymer.

Although the properties of the polymer not having been grafted contained in the graft copolymer are not particularly limited, the weight average molecular weight is preferably 10,000 or more, more preferably 50,000 or more from the viewpoint of increasing mechanical strength. On the other hand, from the viewpoint of improving molding processability, it is preferably 400,000 or less, more preferably 150,000 or less. The weight average molecular weight as referred to herein denotes a polystyrene-equivalent weight average molecular weight measured by GPC using tetrahydrofuran as a solvent. The polymer not having been grafted as referred to herein denotes a soluble component of the graft copolymer that is dissolved and extracted with methyl ethyl ketone.

As described previously, the graft copolymer can be obtained by a polymerization method known in the art. For example, it can be obtained by a method in which emulsion polymerization is performed by feeding a mixture of a chain transfer agent and a monomer mixture including an aromatic vinyl-based monomer (b1) and a vinyl cyanide-based monomer (b2), and a solution of a radical generator dissolved in an emulsifier to a polymerization vessel continuously in the presence of a rubbery polymer (r) latex.

Moreover, the graft copolymer to be used in the present invention also includes a graft copolymer obtained by graft polymerizing a monomer mixture component including an aromatic vinyl-based monomer (b1) and a vinyl cyanide-based monomer (b2) to a (co)polymer, random copolymer, or block copolymer provided as an example in the description of the thermoplastic elastomer. The foregoing description regarding the graft copolymer is applicable also to a graft copolymer prepared using a (co)polymer, random copolymer, or block copolymer. That is, when a co) polymer, random copolymer, or block copolymer is used, the "rubbery polymer" in the foregoing description regarding the aforementioned graft copolymer may be translated to "(co)polymer, random copolymer, or block copolymer."

While the loading of the graft copolymer is not particularly limited as long as it is within the range of the present invention, it is preferably 100 parts by weight or less, more preferably 65 parts by weight or less, even more preferably 50 parts by weight or less, relative to 100 parts by weight in total of the styrene-based resin (B1) and the polylactic acid resin (A), from the viewpoint of lowering the melt viscosity of a material for modeling.

In the present invention, the embodiment in which a graft copolymer has been incorporated in addition to a styrene-based resin (B1) and a polylactic acid resin (A) is also a preferred embodiment. By incorporating the graft copolymer, it is possible to increase the mechanical strength of a filament and a modeled article obtained using a material for modeling. The filament obtained using a material for modeling is generally discharged through a hole provided in the head of an extruder and collected by winding around a bobbin, and the breakage thereof at the time of winding around the bobbin can be inhibited through improvement in mechanical strength. Moreover, it can improve ease-of-use of 3D printing device users and safety can also be improved because the filament itself is made resistant to breakage and even if the filament is broken, the fractured section has a low tendency to be sharp. Furthermore, the machinability of a modeled article can be improved through the improvement in mechanical strength of the modeled article, and it becomes easier to polish the surface thereof with a scraper or the like in order to smoothen the surface and fracture in processing with a drill or the like can be inhibited.

The chromaticity of a material for modeling can also be improved by incorporation of a graft copolymer. Although a coloring agent may be blended with a material for modeling depending on the application of a modeled article, a marble tone may be produced (a marble pattern may occur) depending on the color (e.g., black) and the depth of color when the (A) is insufficiently compatible with the (B1). By incorporating a graft copolymer, it is possible to improve the compatibility of the styrene-based resin (B1) with the polylactic acid resin (A) and improve chromaticity by inhibiting the marble tone (occurrence of a marble pattern).

Examples of other thermoplastic elastomers include a polyether ester block copolymer including an aromatic polyester as a hard segment and poly(alkylene oxide)glycol and/or an aliphatic polyester as a soft segment, a polyester-ester block copolymer, and a polyether ester-ester block copolymer. The aromatic polyester to constitute a hard segment is herein a polymer obtained usually by polycondensing a dicarboxylic acid component containing 60 mol % or more of a terephthalic acid component with a diol component.

Specific examples of the aromatic polyester component include polyethylene terephthalate, polybutylene terephthalate, polyethylene (terephthalate/isophthalate), and polybutylene (terephthalate/isophthalate).

Specific examples of the poly(alkylene oxide)glycol and the aliphatic polyester that constitute a soft segment herein include polyethylene glycol, poly(1,2- and 1,3-propylene oxide)glycol, poly(tetramethylene oxide)glycol, a copolymer of ethylene oxide with propylene oxide, a copolymer of ethylene oxide with hydrofuran, polyethylene adipate, polybutylene adipate, poly-ε-caprolactone, polyethylene sebacate, and polybutylene sebacate.

In the present invention, the loading of the thermoplastic resin (B2) the glass transition temperature of which is 20° C. or lower is preferably 5 to 400 parts by weight relative to 100 parts by weight of the polylactic acid resin (A). The softness of a 3D modeled article may not be developed when the loading of the thermoplastic resin (B2) is less than 5 parts by weight, whereas the viscosity may increase and the polishability of a 3D modeled article may deteriorate when the loading of the thermoplastic resin (B2) exceeds 400 parts by weight. The loading of the thermoplastic resin (B2) is preferably 50 parts by weight or more, more preferably 100 parts by weight or more. On the other hand, the loading of the thermoplastic resin (B2) is preferably 300 parts by weight or less, more preferably 250 parts by weight or less.

In the present invention, it is particularly preferable that the material for modeling includes a thermoplastic resin (B2) the glass transition temperature of which is 20° C. or lower and the thermoplastic resin (B2) includes a copolymerized polyester resin. This can remarkably inhibit a low molecular weight component from bleeding out to the surface of a modeled article.

In the present invention, it is also particularly preferable that the material for modeling includes a styrene-based resin (B1) and a thermoplastic resin (B2) the glass transition temperature of which is 20° C. or lower and the thermoplastic resin (B2) includes a thermoplastic elastomer. This can remarkably improve the impact resistance of a modeled article.

Thus, in the present invention, it is particularly preferable that the thermoplastic resin the glass transition temperature of which is 20° C. or lower is at least one selected from copolymerized polyester resins and thermoplastic elastomers.

(Plasticizer (B3))

The plasticizer (B3) to be used in the present invention may be any substance that imparts softness to the polylactic acid resin (A) and/or the styrene-based resin (B1) and/or the thermoplastic resin (B2) excluding the thermoplastic resin (B2) the glass transition temperature of which is 20° C. or lower, and any common known plasticizer can be used without any limitation, and examples thereof include ester-based plasticizers, glycerin-based plasticizers, multivalent carboxylic acid ester-based plasticizers, polyalkylene glycol-based plasticizers, and castor oil-based plasticizers.

Examples of the ester-based plasticizer to be used in an embodiment of the present invention include polyesters composed of acid components such as adipic acid, sebacic acid, terephthalic acid, isophthalic acid, naphthalenedicarboxylic acid, and diphenyldicarboxylic acid with diol components such as propylene glycol, 1,3-butanediol, 1,4-butanediol, 1,6-hexanediol, ethylene glycol, and diethylene glycol, and polyesters composed of a hydroxycarboxylic acid such as polycaprolactone. These polyesters may be blocked at end with monofunctional carboxylic acids, monofunctional alcohols or may be blocked at end with epoxy compounds or the like. Further examples include polyol esters such as neopentylglycol dibenzoate, diethylene glycol dibenzoate, triethylene glycol di-2-ethylbutyrate, polyoxyethylene diacetate, polyoxyethylene di(2-ethylhexanoate), polyoxypropylene monolaurate, polyoxypropylene monostearate, polyoxyethylene dibenzoate, and polyoxypropylene dibenzoate, and aliphatic carboxylic acid esters such as butyl oleate.

Specific examples of the glycerol-based plasticizers include glycerol monoacetomonolaurate, glycerol diacetomonolaurate, glycerol monoacetomonostearate, glycerol diacetomonoolate, glycerol monoacetomonomontanate, or glycerol triacetate, and one produced by adding an alkylene oxide unit such as ethylene oxide and propylene oxide, such as polyoxyethylene glycerol triacetate, can also be used.

Examples of the polyvalent carboxylic acid ester-based plasticizer include phthalates, such as dimethyl phthalate, diethyl phthalate, dibutyl phthalate, dioctyl phthalate, diheptyl phthalate, dibenzyl phthalate, or butyl benzyl phthalate, trimellitates, such as tributyl trimellitate, trioctyl trimellitate, or trihexyl trimellitate, succinates, such as isodecyl succinate, triethylene glycol monomethyl etherester succinate, or benzylmethyl diglycolester succinate, adipates, such as diisodecyl adipate, n-octyl-n-decyl adipate, diethylene glycol monomethyl etherester adipate, methyl diglycol butyldiglycol ester adipate, benzylmethyldiglycol ester adipate, adipic acid or benzylbutyldiglycol ester adipate, azelates, such as di-2-ethylhexyl azelate, and sebacates, such as dibutyl sebacate and di-2-ethylhexyl sebacate.

Examples of the polyalkylene glycol plasticizer include polyalkylene glycols, such as polyethylene glycol, polypropylene glycol, poly(ethylene oxide/propylene oxide) block copolymer and/or random copolymer; polytetramethylene glycol, ethylene oxide addition polymers of bisphenols, propylene oxide addition polymers of bisphenols, and tetrahydrofuran addition polymers of bisphenols, or end-blocked compounds thereof such as end epoxy-modified compounds or end ether-modified compounds, and from the viewpoint of heat resistance, polyethylene glycol, polypropylene glycol, poly(ethylene oxide/propylene oxide) block and/or random copolymer are preferably used.

The castor oil-based plasticizer may be any of castor oil and its derivatives, and examples thereof include castor oil, dehydrated castor oil, hardened castor oil, castor oil fatty acid, dehydrated castor oil fatty acid, ricinoleic acid, 12-hydroxystearic acid, sebacic acid, undecylenic acid, heptylic acid, castor oil fatty acid condensate, castor oil fatty acid ester, methyl ricinoleate, ethyl ricinoleate, isopropyl ricinoleate, butyl ricinoleate, ethylene glycol monoricinoleate, propylene glycol monoricinoleat, trimethylolpropane monoricinoleat, sorbitan monoricinoleat, castor oil fatty acid polyethylene glycol ester, castor oil ethylene oxide adduct, castor oil-based polyol, castor oil-based toluol, or castor oil-based diol. Of these, castor oil fatty acid ester, methyl ricinoleate, ethyl ricinoleate, isopropyl ricinoleate, butyl ricinoleate, ethylene glycol monoricinoleate, propylene glycol monoricinoleate, trimethylolpropane monoricinoleate, sorbitan monoricinoleate, castor oil fatty acid polyethylene glycol ester, castor oil ethylene oxide adduct, castor oil-based polyol, castor oil-based toluol, and castor oil-based diol are preferably used in terms of transparency.

Examples of other plasticizers include hydroxy acid esters, such as triethyl acetylcitrate, tributyl acetylcitrate, ethoxycarbonylmethyldibutyl citrate, di-2-ethylhexyl citrate, methyl acetylricinolate, or butyl acetylricinolate; vegetable oil-based compounds, such as soybean oil, soybean oil fatty acid, soybean oil fatty acid ester, epoxidized soybean oil, rapeseed oil, rapeseed oil fatty acid, rapeseed oil fatty acid ester, epoxidized rapeseed oil, linseed oil, linseed oil fatty acid, linseed oil fatty acid ester, epoxidized linseed oil, coconut oil, or coconut oil fatty acid; pentaerythritol, sorbitol, polyacrylates, silicone oil, and paraffins.

The plasticizer (B3) to be used in the present invention is preferably at least one selected from ester-based plasticizers and polyalkylene glycol-based plasticizers.

While either one species or a combination of two or more species may be used as the plasticizer (B3) to be used in an embodiment of the present invention, it is preferable that at least one species is an ester-based plasticizer, and especially, an adipate-based plasticizer is used particularly preferably from the viewpoint of softness.

The adipate-based plasticizer to be used in the present invention is an ester compound of adipic acid with one or more species of and two or more equivalents of alcohol or ether alcohol. Specific examples of the alcohol to be used as a feed material of the adipate-based plasticizer include methanol, ethanol, 1-propanol, 2-propanol, 1-butanol, 2-butanol, 2-methyl-1-propanol, 1,1-dimethyl-1-ethanol, pentanol, hexanol, heptanol, octanol, phenol, benzyl alcohol, and phenethyl alcohol. Of these, methanol, ethanol, 1-propanol, 1-butanol, pentanol, hexanol, heptanol, octanol, benzyl alcohol, and phenethyl alcohol are preferable, and benzyl alcohol, 1-butanol, octanol, and phenethyl alcohol are used more preferably.

Examples of the ether alcohol to be used as a feed material of the adipate-based plasticizer include the aforementioned ethylene oxide adducts and propylene oxide adducts of the aforementioned alcohols. Specific examples include ethylene oxide adducts such as ethylene glycol monomethyl ether, ethylene glycol monoethyl ether, ethylene glycol monobutyl ether, ethylene glycol monophenyl ether, ethylene glycol monobenzyl ether, diethylene glycol monomethyl ether, diethylene glycol monoethyl ether, diethylene glycol monobutyl ether, diethylene glycol monophenyl ether, diethylene glycol monobenzyl ether, triethylene glycol monomethyl ether, triethylene glycol monoethyl ether, triethylene glycol monobutyl ether, triethylene glycol monophenyl ether, and triethylene glycol monobenzyl ether; and propylene oxide adducts such as propylene glycol monomethyl ether, propylene glycol monoethyl ether, propylene glycol monobutyl ether, propylene glycol monophenyl ether, propylene glycol monobenzyl ether, dipropylene glycol monomethyl ether, dipropylene glycol monoethyl ether, dipropylene glycol monobutyl ether, dipropylene glycol monophenyl ether, dipropylene glycol monobenzyl ether, tripropylene glycol monomethyl ether, tripropylene glycol monoethyl ether, tripropylene glycol monobutyl ether, tripropylene glycol monophenyl ether, and tripropylene glycol monobenzyl ether.

Of these, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, etc. are preferable, and diethylene glycol monomethyl ether, diethylene glycol monoethyl ether, and diethylene glycol monobutyl ether are used more preferably.

The weight average molecular weight of the adipate-based plasticizer is not particularly limited; generally, a smaller molecular weight results in a greater plasticizing effect but results in lowered stability, leading to an increased possibility of blocking and stain generation due to bleeding out to the surface of an object. Thus, the number average molecular weight of the adipate-based plasticizer is preferably 0.200 to 1500, more preferably 300 to 1000.

The loading of the plasticizer (B3) is 5 to 30 parts by weight relative to 100 parts by weight of the polylactic acid resin (A). If the amount of the plasticizer (B3) is less than 5 parts by weight, the softness of a 3D modeled article is not developed, and if that amount exceeds 30 parts by weight, the plasticizer bleeds out and a surface is polluted therewith. The loading of the plasticizer (B3) is preferably 10 parts by weight or more. On the other hand, the loading of the plasticizer (B3) is preferably 20 parts by weight or less.

In the present invention, it is preferable that the material for modeling includes a plasticizer (B3) and the plasticizer (B3) includes an ester-based plasticizer and/or a polyalkylene glycol-based plasticizer.

Thus, in the present invention, it is particularly preferable that the plasticizer (B3) is at least one selected from ester-based plasticizers and polyalkylene glycol-based plasticizers.

(Epoxy Group-Containing Compound (C))

The compatibility of a filament, particle, or pellet for a fused deposition modeling type 3D printing device can be further improved by further incorporating a compound (C) having at least one or more epoxy group (hereinafter sometimes referred to as "epoxy group-containing compound (C)") in the material for modeling of the present invention. However, compounds corresponding to the styrene-based resin (B1) are excluded from the epoxy group-containing compound (C).

Examples of the compound (C) having at least one or more epoxy group to be used in the present invention include glycidyl ether compounds, glycidyl ester compounds, glycidyl amine compounds, glycidyl imide compounds, or alicyclic epoxy compounds, and from the viewpoint of excelling in mechanical properties, moldability, and long-term durability such as heat resistance, hydrolysis resistance or dry heat resistance, the compound (C) preferably includes two or more selected from glycidyl ether compounds and glycidyl ester compounds, and more preferably includes at least one compound selected from glycidyl ether compounds and at least one compound selected from glycidyl ester compounds.

The glycidyl ether compound as referred to herein is a compound having an etherified glycidyl group, and specific examples thereof include glycerol triglycidyl ether, trimethylolpropane triglycidyl ether, and pentaerythritol polyglycidyl ether.

The glycidyl ester compound as referred to herein is a compound having an esterified glycidyl group, and specific examples thereof include triglycidyl trimesate, triglycidyl trimellitate, and tetraglycidyl pyromellitate.

Specific examples of the glycidylamine compound include tetraglycidylaminodiphenylmethane, triglycidyl-paraaminophenol, triglycidyl-metaaminophenol, tetraglycidylmetaxylenediamine, tetraglycidylbisaminomethylcyclohexane, triglycidyl cyanurate, and triglycidyl isocyanurate.

In addition, examples of another epoxy compound include epoxy-modified fatty acid glycerides, such as epoxidized soybean oil, epoxidized linseed oil, and epoxidized whale oil, phenol novolac type epoxy resin, cresol novolac type epoxy resin, or polymers including glycidyl group-containing vinyl-based units, and the polymers including glycidyl group-containing vinyl-based units are preferable in terms of excellent processability.

Specific examples of the feed monomer to forma glycidyl group-containing vinyl-based unit include glycidyl esters of unsaturated monocarboxylic acids, such as glycidyl (meth)acrylate and glycidyl p-styrylcarboxylate, monoglycidyl esters or polyglycidyl esters of unsaturated polycarboxylic acids, such as maleic acid and itaconic acid, and unsaturated glycidyl ethers, such as allyl glycidyl ether, 2-methylallyl glycidyl ether, and styrene-4-glycidyl ether. Of these, glycidyl acrylate or glycidyl methacrylate is preferably used in terms of radical polymerizability. These may be used individually or two or more of them may be used in combination.

The polymer including glycidyl group-containing vinyl-based units preferably includes a vinyl-based unit other than the glycidyl group-containing vinyl-based unit as a copolymerization component, and properties of the polymer, including melting point and glass transition temperature, can be regulated through the selection of the additional unit. Examples of the vinyl-based unit other than the glycidyl group-containing vinyl-based unit include acrylic vinyl units, vinyl carboxylate units, aromatic vinyl units, unsaturated dicarboxylic acid anhydride-based units, unsaturated dicarboxylic acid-based units, aliphatic vinyl units, maleimide-based units, or other vinyl-based units.

Specific examples of the feed monomer to form an acrylic vinyl unit include feed monomers to form an acrylic vinyl unit having an amino group, such as acrylic acid, methacrylic acid, methyl acrylate, methyl methacrylate, ethyl acrylate, ethyl methacrylate, acrylic acid propyl, propyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, cyclohexyl acrylate, cyclohexyl methacrylate, isobornyl acrylate, isobornyl methacrylate, lauryl acrylate, lauryl methacrylate, stearyl acrylate, stearyl methacrylate, hydroxyethyl acrylate, hydroxyethyl methacrylate, hydroxypropyl acrylate, hydroxypropylmethacrylate, acrylic ester or methacrylic ester of polyethylene glycol or polypropylene glycol, trimethoxysilylpropyl acrylate, trimethoxysilylpropyl methacrylate, methyldimethoxysilylpropyl acrylate, methyldimethoxysilylpropyl methacrylate, acrylonitrile, methacrylonitrile, N,N-dialkylacrylamide, N,N-dialkylmethacrylamide, α-hydroxymethylacrylic acid esters, dimethylaminoethyl acrylate, and dimethylaminoethyl methacrylate, and of these, acrylic acid, methacrylic acid, methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, cyclohexyl acrylate, cyclohexyl methacrylate, isobornyl acrylate, isobornyl methacrylate, acrylonitrile, and methacrylonitrile are preferable, and moreover, acrylic acid, methacrylic acid, methyl acrylate, methyl methacrylate, ethyl acrylate, ethyl methacrylate, n-butyl acrylate, n-butyl methacrylate, 2-ethylhexyl acrylate, 2-ethylhexyl methacrylate, acrylonitrile, and methacrylonitrile are used. These may be used individually or two or more of them may be used in combination.

Specific examples of the feed monomer to form a vinyl carboxylate-based unit include vinyl monofunctional aliphatic carboxylates, such as vinyl formate, vinyl acetate, vinyl propionate, vinyl butyrate, vinyl caproate, vinyl caprylate, vinyl caprate, vinyl laurate, vinylmyristate, vinyl pulmitate, vinyl stearate, isopropenyl acetate, 1-butenyl acetate, vinyl pivalate, vinyl 2-ethylhexanoate, and vinyl cyclohexanecarboxylate, vinyl aromatic carboxylates, such as vinyl benzoate and vinyl cinnamate, and vinyl polyfunctional carboxylates, such as vinyl monochloroacetate, divinyl adipate, vinyl methacrylate, vinyl crotonate, and vinyl sorbate, and especially, vinyl acetate is preferably used. These may be used individually or two or more of them may be used in combination.

Specific examples of the feed monomer to form an aromatic vinyl unit include styrene, α-methylstyrene, p-methylstyrene, α-methyl-p-methylstyrene, p-methoxystyrene, o-methoxystyrene, 2,4-dimethylstyrene, 1-vinylnaphthalene, chlorostyrene, bromostyrene, divinylbenzene, and vinyltoluene, and especially, styrene and α-methylstyrene are preferably used. These may be used individually or two or more of them may be used in combination.

Examples of the feed monomer to form an unsaturated dicarboxylic anhydride-based unit include maleic anhydride, itaconic anhydride, glutaconic anhydride, citraconic anhydride, or aconitic anhydride, and especially, maleic anhydride is preferably used. These may be used individually or two or more of them may be used in combination.

Examples of the feed monomer to form an unsaturated dicarboxylic acid-based unit include maleic acid, monoethyl maleate, itaconic acid, and phthalic acid, and especially, maleic acid and itaconic acid are preferably used. These may be used individually or two or more of them may be used in combination.

Examples of the feed monomer to form an aliphatic vinyl-based unit include ethylene, propylene, or butadiene, examples of the feed monomer to form a maleimide-based unit include maleimide, N-methylmaleimide, N-ethylmaleimide, N-propylmaleimide, N-isopropylmaleimide, N-cyclohexylmaleimide, N-phenylmaleimide, N-(p-bromophenyl)maleimide, or N-(chlorophenyl)maleimide, examples of the feed monomer to form another vinyl-based unit include N-vinyldiethylamine, N-acetylvinylamine, allylamine, metaallylamine, N-methylallylamine, and p-aminostyrene, and these may be used individually or two or more of them may be used in combination.

In preparation of the polymer including glycidyl group-containing vinyl-based units in the present invention, a sulfur compound may be used as a chain transfer agent (molecular weight regulator) in order to obtain a low molecular weight product and, in this case, the polymer usually contains sulfur. While the sulfur content is not particularly limited herein, a smaller sulfur content is preferred from the viewpoint of suppressing an offensive odor. Specifically, the sulfur content is preferably 1000 ppm or less in terms of sulfur atoms, more preferably 100 ppm or less, even more preferably 10 ppm or less, most preferably 1 ppm or less.

The weight average molecular weight of a polymer including glycidyl group-containing vinyl-based units, which is not particularly limited, is preferably 20,000 or less, more preferably 10,000 or less.

In the present invention, examples of commercially available products of the polymer including glycidyl group-containing vinyl-based units include "MARPROOF" (registered trademark) produced by NOF Corporation, "Joncryl" (registered trademark) produced by BASF, and "ARUFON" (registered trademark) produced by Toagosei Co., Ltd.

As described above, one of the preferred embodiments of the present invention is that the material for modeling incorporates a thermoplastic resin (B2) the glass transition temperature of which is 20° C. or lower, or that a graft copolymer is used as the thermoplastic resin (B2) the glass transition temperature of which is 20° C. or lower.

On the other hand, a graft copolymer the glass transition temperature of which exceeds 20° C. may be contained in the material for modeling as long as it is within the range of the present invention.

For example, in the present invention, one preferable embodiment may be a material for fused deposition modeling type three-dimensional modeling in which a styrene-based resin (B1) obtained by copolymerizing at least an aromatic vinyl-based monomer (a1) with a vinyl cyanide-based monomer (a2), a polylactic acid resin (A), and a graft copolymer, which may have any glass transition temperature, are mixed.

In the event that the material for modeling of the present invention incorporates a graft copolymer (regardless of the glass transition temperature thereof), it is preferable to further incorporate phosphoric acid and/or monosodium phosphate.

Although a graft copolymer may exhibit alkalinity during the production thereof, it is possible to inhibit the alkali decomposition of the polylactic acid resin (A) and improve its thermal stability by incorporating phosphoric acid and/or monosodium phosphate, and thus, the melt viscosity at the time of modeling can be kept constant. Phosphoric acid and/or monosodium phosphate is superior to other neutralizing agents having already been known, including organic acids, in terms of safety and health to the human body associated with an irritating odor generated during the feed mixing or melt compounding of the material for modeling and during modeling by fused deposition modeling and in terms of the thermal stability of the material for modeling.

In the material for modeling of the present invention, the loading of phosphoric acid and/or monosodium phosphate is preferably within the range of 0.01 to 5 parts by weight relative to 100 parts by weight in total of the styrene-based resin (B1) and the polylactic acid resin (A). By adjusting the loading of phosphoric acid and/or monosodium phosphate to 0.01 parts by weight or more, it is possible to further improve the alkali decomposition-inhibiting effect of the polylactic acid resin (A) and keep the melt viscosity at the time of modeling more constant. On the other hand, by adjusting the loading of phosphoric acid and/or monosodium phosphate to 5 parts by weight or less, it is possible to inhibit foaming of the material for modeling during melting and thereby improve the appearance of a modeled article, and excellent safety in use is attained.

In the present invention, any acidic substance capable of neutralizing alkalinity can be used according to necessity in addition to phosphoric acid and/or monosodium phosphate. Specific examples include inorganic acids, such as hydrochloric acid, sulfuric acid, and nitric acid, organic acids, such as acetic acid, oxalic acid, malonic acid, succinic acid, maleic acid, adipic acid, sebacic acid, azelaic acid, dodecanedioic acid, cyclohexanedicarboxylic acid, citric acid, terephthalic acid, isophthalic acid, orthophthalic acid, benzoic acid, trimellitic acid, pyromellitic acid, phenol, naphthalene dicarboxylic acid, and diphenic acid, and acid anhydrides of oxalic acid, malonic acid, succinic acid, maleic acid, adipic acid, sebacic acid, azelaic acid, dodecanedioic acid, citric acid, orthophthalic acid, trimellitic acid, and pyromellitic acid. Two or more of these may be used in combination.

In the material for modeling of the present invention, an acrylic resin may further be incorporated in addition to the styrene-based resin (B1) and the polylactic acid resin (A). That is, it is preferable that an acrylic resin is further incorporated in the material for modeling of the present invention when the styrene-based resin (B1) is incorporated.

The acrylic resin to be used in the present invention is a polymer or copolymer of an alkyl (meth)acrylate-based monomer, and it is possible to increase the mechanical strength of a material for modeling and a modeled article obtained using the material by incorporating such an acrylic resin.

Examples of the alkyl (meth)acrylate-based monomer include methyl methacrylate, methyl acrylate, ethyl acrylate, ethyl methacrylate, butyl acrylate, butyl methacrylate, cyclohexyl methacrylate, hydroxyethyl methacrylate, glycidyl methacrylate, allyl methacrylate, aminoethyl acrylate, propylaminoethyl acrylate, 2-hydroxyethyl acrylate, 2-hydroxypropyl acrylate, glycidyl acrylate, dicyclopentenyloxyethyl acrylate, dicyclopentanyl acrylate, diacrylic acid butanediol, diacrylic acid nonanediol, diacrylic acid polyethylene glycol, methyl 2-(hydroxymethyl)acrylate, ethyl 2-(hydroxymethyl)acrylate, methacrylic acid, ethyl methacrylate, butyl methacrylate, cyclohexyl methacrylate, dimethylaminoethyl methacrylate, ethylaminopropyl methacrylate, phenylaminoethyl methacrylate, cyclohexylaminoethyl methacrylate, 2-hydroxyethyl methacrylate, 2-hydroxypropyl methacrylate, glycidyl methacrylate, dicyclopentenyloxyethyl methacrylate, dicyclopentanyl methacrylate, pentamethylpiperidyl methacrylate, tetramethylpiperidyl methacrylate, benzyl methacrylate, ethylene glycol dimethacrylate, propylene glycol dimethacrylate, and polyethylene glycol dimethacrylate. These may be used individually or in combination.

Moreover, a compound with a ring structure, such as a lactone ring, maleic anhydride, and glutaric anhydride, may be copolymerized together with the aforementioned alkyl (meth)acrylate-based monomer.

As the acrylic resin to be used in the present invention, a polymethyl methacrylate-based resin including a methyl methacrylate component unit as a main component is preferable, a polymethyl methacrylate-based resin including a methyl methacrylate component unit in an amount of 70% by weight or more of all the monomers is more preferable, and polymethyl methacrylate (PMMA) resin is even more preferable.

While the molecular weight and the molecular weight distribution of the acrylic resin are not particularly limited, the weight average molecular weight is preferably 1,000 or more, more preferably 10,000 or more, even more preferably 30,000 or more from the viewpoint of improving the mechanical strength of the material for modeling and a filament and a modeled article obtained using the material. On the other hand, from the viewpoint of inhibiting increase in melt viscosity, the weight average molecular weight is preferably 450,000 or less, more preferably 300,000 or less, even more preferably 200,000 or less. The weight average molecular weight as referred to herein is a polymethyl methacrylate (PMMA)-equivalent weight average molecular weight measured by GPC using tetrahydrofuran as a solvent.

A loading of the acrylic resin being 20 parts by weight relative to 100 parts by weight in total of the styrene-based resin (B1) and the polylactic acid resin (A) is sufficient, and even if the acrylic resin is incorporated more than that amount, no further enhanced effect is expected.

In material for modeling of the present invention, it is preferable to further incorporate a carboxyl group-reactive end blocking agent from the viewpoint of suppression of heat decomposition and hydrolysis of the polylactic acid resin (A) and improvement in durability of the resin. The carboxyl group-reactive end blocking agent as referred to herein does not include the aforementioned epoxy group-containing compound. The carboxyl group-reactive end blocking agent is not particularly limited as long as it is a compound capable of blocking a carboxyl group of the polylactic acid resin (A). In the present invention, the carboxyl group-reactive end blocking agent not only can block an end of the polylactic acid resin (A) but also can block a carboxyl group of an acidic low molecular weight compound that is generated by heat decomposition, hydrolysis, or the like, such as lactic acid and formic acid. The aforementioned end blocking agent is preferably a compound capable of blocking also a hydroxy group of an acidic low molecular weight compound generated by decomposition of the polylactic acid resin (A).

As such a carboxyl group-reactive end blocking agent, an epoxy compound, an oxazoline compound, a carbodiimide compound, and an isocyanate compound are preferable, and two or more of them may be incorporated in combination. Especially, an epoxy compound and/or a carbodiimide compound are preferable.

The loading of the carboxyl group-reactive end blocking agent in the material for modeling of the present invention is preferably within the range of 0.01 to 10 parts by weight, more preferably within the range of 0.05 to 5 parts by weight relative to 100 parts by weight of the polylactic acid resins (A) from the viewpoint of the aforementioned suppression of decomposition and a lower melt viscosity.

In the material for modeling of the present invention, various thermoplastic resins may be incorporated as long as the object of the present invention is not impaired. Examples of the thermoplastic resin include polyolefin resins, such as polyethylene and polypropylene, polyester resins other than the polylactic acid resin (A), polyamide resins, such as nylon 6 and nylon 6,6 grades, modified polyphenylene ether (PPE) resins, polycarbonate resins, polyacetal resins, or their modified products, and elastomers.

In the material for modeling of the present invention, antioxidants, such as hindered phenol antioxidants, sulfur-containing compound-based antioxidants, or phosphorus-containing organic compound-based antioxidants, heat stabilizers, such as phenol heat stabilizers and acrylate heat stabilizers, UV absorbers, such as benzotriazole-based UV absorbers, benzophenone-based UV absorbers, or salicylate-based UV absorbers, light stabilizers, such as organic nickel-based light stabilizers and hindered amine-based light stabilizers, metal salts of higher fatty acids, lubricants, such as higher fatty acid amides, plasticizers, such as phthalates and phosphates, flame retardants, such as brominated compounds, phosphates, or red phosphorus, flame retardant aids, such as antimony trioxide and antimony pentoxide, metal salts of alkylcarboxylic acids or alkylsulfonic acids, pigments and dyes may be incorporated as long as the effect of the present invention is not impaired.

In the present invention, it is particularly preferable to incorporate a stabilizer from the point that a modeled article made of a material for fused deposition modeling type three-dimensional modeling excelling in durability can be obtained. As the stabilizer, one that is used as a stabilizer for thermoplastic resin is usually preferable, and especially, at least one or more selected from antioxidants, light stabilizers, and UV absorbers is more preferable. Specific examples thereof include hindered phenol compounds, phosphite compounds, phosphate compounds, thioether compounds, benzophenone-based compounds, benzotriazole-based compounds, aromatic benzoate compounds, oxalic acid anilide-based compounds, cyanoacrylate compounds, and hindered amine compounds.

To the material for fused deposition modeling type three-dimensional modeling to be used in the present invention may be added fillers (e.g., glass fiber, carbon fiber, metal fiber, natural fiber, organic fiber, glass flake, glass bead, ceramic fiber, ceramic bead, asbestos, wollastonite, talc, clay, mica, synthetic mica, sericite, zeolite, bentonite, dolomite, kaolinite, silica, fine powder silicic acid, feldspathic powder, Potassium titanate, shirasu balloon, calcium carbonate, magnesium carbonate, barium sulfate, calcium oxide, aluminum oxide, titanium oxide, aluminum silicate, zirconium silicate, silicon oxide, gypsum, novaculite, dawsonite, montmorillonite, graphite, carbon black, zinc oxide, magnesium oxide, calcium sulfide, boron nitride, and white earth), coloring agents including dye and pigment, nucleating agents, antistatic agents, etc. as long as the object of the present invention is not impaired. Two or more of these may be added in combination.

The material for modeling of the present invention can be obtained, for example, by compounding appropriate amounts of constitutional components and then melt-kneading them. As the method for melt-kneading the constituents, a method of melt-kneading with an extruder known in the art such as a single screw or twin screw extruder having a heating device and a vent port is preferred.

In the production of the material for fused deposition modeling type three-dimensional modeling of the present invention, the mixing method and the mixing device to be used in the case of adding additives such as the polylactic acid resin (A), the styrene-based resin (B1) and the thermoplastic resin (E2) the glass transition temperature of which is 20° C. or lower, a plasticizer (B3) and an epoxy group-containing compound (C) are not particularly limited, and a method of melt-kneading with an extruder known in the art such as a single screw or twin screw extruder having a heating device and a vent port is preferred.

While the heating temperature at the time of melt-kneading is chosen usually from the range of 170 to 260° C., preferably from the range of 150° C. to 250° C., the temperature gradient, etc. at the time of melt-kneading may be set freely as long as the object of the present invention is not impaired.

While the shape of the material for modeling of the present invention is not particularly limited, it is preferable to employ a filament, a pellet, a powder or the like.

A filament for a fused deposition modeling type 3D printing device can be obtained by molding the material for modeling of the present invention usually by extrusion forming known in the art. The thickness of the filament may be freely adjusted so that it may be suited for a 3D printing device for which it is used, and generally a filament having a diameter of 1.5 to 2.0 mm is suitably used.

Thus, the present invention includes an invention relating to use of a material for modeling for producing a filament, particle, or pellet for a fused deposition modeling type 3D printing device to be used for producing a modeled article by using a fused deposition modeling type 3D printing device.

The present invention includes an invention relating to a method for producing a filament, particle or pellet for a fused deposition modeling type 3D printing device including a step of obtaining a filament, particle or pellet by molding a material for modeling.

A modeled article can be obtained by modeling such a filament, particle or pellet for a fused deposition modeling type 3D printing device.

Thus, the present invention includes an invention relating to use of a filament, particle or pellet for a fused deposition modeling type 3D printing device for producing a modeled article by using a fused deposition modeling type 3D printing device.

Moreover, the present invention includes an invention relating to a method for producing a modeled article including a step of obtaining a modeled article with a fused deposition modeling type 3D printing device using such a filament, particle or pellet for a fused deposition modeling type 3D printing device.

EXAMPLES

In order to explain the material for modeling of the present invention more concretely, examples are described below. The present invention is not limited to these examples. In the following examples and comparative examples, items expressed with "part" and "%" each denote part by weight and % by weight unless stated otherwise.
[Methods for Measurement of Properties]
(1) Glass Transition Temperature (Tg)

Tg was measured with a differential scanning calorimeter according to JIS K7121. The measurement was performed using 10 mg of a sample in a nitrogen atmosphere at a temperature ramp-up rate of 20° C./minute. The glass transition temperature shall be a mid-point temperature of glass transition.
(2) Weight Average Molecular Weight The weight average molecular weight of a styrene-based resin (B1) and a fraction soluble in methyl ethyl ketone of a graft copolymer was measured as a polystyrene (PS)-equivalent weight average molecular weight (Mw) under conditions including a flow rate of 1 ml/minute and a column temperature of 40° C. by using a gel permeation chromatograph (GPC) manufactured by Water and using a differential refractometer (Water 2414) as a detector, MIXED-B (two columns) manufactured by Polymer Laboratories as columns, and tetrahydrofuran as an eluate.

The weight average molecular weight of a polylactic acid resin (A) was measured as a polymethyl methacrylate (PMMA)-equivalent weight average molecular weight (Mw) by using the same instruments and conditions as those previously described except using hexafluoroisopropanol as an eluate.
(3) Degree of Grafting of Graft Copolymer The degree of grafting of a graft copolymer was determined by the following method. Acetone was added to a prescribed amount (m) of a graft copolymer and then was refluxed for 4 hours. This solution was centrifugally separated at a rotation of 8000 rpm (centrifugal force of 10,000 G) for 30 minutes and then insolubles were collected by filtration. The insolubles were dried under reduced pressure at a temperature of 70° C. for 5 hours and then the weight (n) thereof was measured. The degree of grafting was calculated by the following formula. In the following formula, L denotes the rubber content (% by weight) of a graft copolymer.

Degree of grafting (%)=[(n)−{(m)×L/100}]/[(m)×L/100]×100.

(4) Melt Viscosity

For pellets of the material for modeling obtained in each of Examples and Comparative Examples, a melt flow rate (MFR) was measured at 220° C. and a load of 98 N in accordance with ISO1133 (Method A, 1997).

(5) Deflection Temperature Under Load

Deflection temperature under load was measured from a specimen obtained in each of Examples and Comparative Examples under a load of 0.45 MPa in accordance with ISO 75-1 (2004) flatwise.

(6) Charpy Impact Strength

Charpy impact strength was measured from a specimen obtained in each of Examples and Comparative Examples in accordance with ISO 179-1 (2000) Type A.

(7) Degree of Warpage

The degree of warpage was measured by using a clearance gauge with an obtained modeled article being placed on a plane stand.

(8) Bleeding Out Property

A modeled article was put into a thermohygrostat that was set at a temperature of 40° C. and a humidity of 85% RH and taken out after one week, and then the presence of bleeding out was examined.

++: No bleeding out was confirmed on the surface of the modeled article.

+: When the surface of the modeled article was touched by hand, a bleed attached to the hand a little.

−: When the surface of the modeled article was touched by hand, a bleed attached to the hand.

(9) Polishability

In order to make the surface of a modeled article flat, the surface was polished with 1200 grade sandpaper.

++: The surface of the modeled article was able to be polished satisfactorily.

+: When the surface of a modeled article was polished, resin fragments remained on the surface.

−: The surface of a modeled article was not able to be polished.

[Feed Materials Used in Examples and Comparative Examples]

The feed materials used for the practice of the present invention are shown below.

(A) Polylactic acid resin (A-1) D-lactic acid content=1.4%, Mw=215,000 (PMMA-equivalent)

(A-2) D-lactic acid content=4.3%, Mw=245,000 (PMMA-equivalent)

(A-3) D-lactic acid content=1.4%, Mw=116,000 (PMMA-equivalent)

(A-4) D-lactic acid content=12.0%, Mw=220,000 (PMMA-equivalent)

(A-5) D-lactic acid content=5.0%, Mw=220,000 (PMMA-equivalent)

(B1) Styrene-based resin

A reactor was charged with 80 parts by weight of acryl amide, 20 parts by weight of methyl methacrylate, 0.3 parts by weight of potassium persulfate, and 1800 parts by weight of ion-exchanged water, and then the gas phase in the reactor was purged with nitrogen gas and the temperature was kept at 70° C. while stirring well. The reaction was continued until the monomers were converted into a polymer completely, so that a whitish, viscous aqueous solution of an acrylamide-methyl methacrylate copolymer was obtained. To this were added 35 parts by weight of sodium hydroxide and ion-exchanged water, forming 0.6% by weight of acrylamide-methyl methacrylate copolymer, which was then further stirred at 70° C. for 2 hours and cooled to room temperature. Thus, a transparent aqueous solution of an acrylamide-methyl methacrylate copolymer, which would serve as a medium for suspension polymerization, was obtained.

To a polymerization vessel (autoclave made of stainless steel) was added 6 parts by weight of the aforementioned aqueous solution of an acrylamide-methyl methacrylate copolymer, and the inside of the system was purged with nitrogen gas under stirring. Next, the mixed substances given below were added under stirring and then the temperature was raised to 60° C. to start polymerization.

| Styrene | 70 parts by weight |
| Acrylonitrile | 30 parts by weight |
| t-Dodecylmercaptan | 0.36 parts by weight |
| 2,2'-Azobisisobutyronitrile | 0.31 parts by weight |

The reaction temperature was raised to 65° C. over 30 minutes and then raised to 100° C. over 120 minutes. Henceforth, cooling of the reaction system and separation, washing, and drying of a polymer were carried out by ordinary methods and thus a polymer in the form of beads was obtained. The weight average molecular weight of the resulting styrene-based resin (B1-1) was 101,000.

(B2) Thermoplastic resin the glass transition temperature of which is 20° C. or lower (B2-1) Graft copolymer Polybutadiene ("Nipol LX111A2" produced by Nippon Zeon Co., Ltd., weight average particle diameter=0.35 gel content=75% by weight) 50 parts by weight (solids content equivalent)

| Potassium oleate | 0.5 parts by weight |
| Grape sugar | 0.5 parts by weight |
| Monosodium pyrophosphate | 0.5 parts by weight |
| Ferrous sulfate | 0.005 parts by weight |
| Deionized water | 120 parts by weight |

The substances given above were charged into a polymerization vessel and the temperature thereof was raised to 65° C. under stirring. The time when the internal temperature reached 65° C. was considered as the onset of polymerization, and 35 parts by weight of styrene, 15 parts by weight of acrylonitrile, and 0.3 parts by weight of t-dodecylmercaptan were added dropwise continuously over 5 hours. In parallel, an aqueous solution composed of 0.25 parts by weight of cumene hydroperoxide, 2.5 parts by weight of potassium oleate, and 25 parts by weight of pure water was added dropwise continuously over 7 hours, and thus the reaction was completed. The resulting graft copolymer latex was solidified with sulfuric acid, neutralized with caustic soda, and then washed, filtered, and dried into a powder. The glass transition temperature of polybutadiene was about −70° C., the degree of grafting of the resulting graft copolymer was 50%, and the weight average molecular weight of the fraction soluble in methyl ethyl ketone was 83,000.

(B2-2) Copolymerized polyester (aliphatic aromatic polyester resin)
Polybutylene-adipate terephthalate: "ecoflex" (registered trademark) C1200 (produced by BASF Japan Ltd.), glass transition temperature=−30° C.
(B2-3) Copolymerized polyester (aliphatic polyester resin)
Polybutylene-succinate adipate: "Bionolle" (registered trademark) 3001MD (produced by Showa Highpolymer Co., Ltd.), glass transition temperature=−45° C.
(B2-4) Thermoplastic elastomer
Block copolymer of terephthalic acid, 1,4-butanediol, and tetramethylene glycol: "Hytrel" (registered trademark) 4047 (produced by Du Pont-Toray Co., Ltd.), glass transition temperature=−40° C.
(B2-5) Thermoplastic elastomer
Acrylic elastomer: "METABLEN" (registered trademark) S-2001 (produced by Mitsubishi Rayon Co., Ltd.), glass transition temperature=−40° C.
(B2-6) Blend (mixture) of a styrene-based resin and a graft copolymer
ABS resin: "TOYOLAC" (registered trademark) produced by Toray Industries, Inc., high flow type ABS resin "250-X01", glass transition temperature of graft copolymer=about −70° C., glass transition temperature of styrene-based resin=105° C.
(B2-7) Blend (mixture) of a styrene-based resin, a graft copolymer, and a thermoplastic resin the glass transition temperature of which is higher than 20° C.
Alloy of an ABS resin and a polycarbonate (PC) resin: "TOYOLAC" produced by Toray Industries, Inc., high flow type ABS resin•PC resin alloy "PX10-X11", glass transition temperature of graft copolymer=about −70° C., glass transition temperature of styrene-based resin=105° C., glass transition temperature of PC resin=147° C.
(B2-8) Nylon 6 resin: "Amilan" (registered trademark) CM1010 (produced by Toray Industries, Inc.), glass transition temperature=58° C.
(B3) Plasticizer
(B3-1) Adipate-based plasticizer: DAIFATTY-101 (produced by Daihachi Chemical Industry Co., Ltd.), weight average molecular weight=340.
(C) Epoxy group-containing compound
(C-1) Epoxy group-containing (meth)acrylic polymer: Joncryl (registered trademark) ADR-4368 (produced by BASF Japan Ltd.), weight average molecular weight=8,000.

Examples 1 to 8, Comparative Examples 1 to 5

Production of Material for Modeling

The polylactic acid resin (A), the styrene-based resin (B1), and the graft copolymer (B2), each described above, were mixed at the mixing ratios given in Table 1, melt-kneaded using a vented 30 mm twin screw extruder (PCM-30 manufactured by Ikegai Ltd.) (barrel temperature set at 230° C.) and extruded to produce a pelletized material for modeling. Using the resulting pelletized material for modeling, the evaluation of (4) described above was carried out.
[Evaluation of Material for Modeling]
A specimen was obtained by injection molding the resulting pelletized material for modeling at a cylinder temperature of 220° C. and a mold temperature of 60° C. Using the specimen obtained, evaluation was performed with respect to the above-mentioned (5) to (6). The results are shown in Table 1 (Examples 1 to 8, Comparative Examples 1 to 5).

[Production and Evaluation of Monofilament]
The resulting material for modeling was dried with hot air at a temperature of 70° C. for 5 hours and then was fed into a single screw melt-extruder the temperature of which was set at 200° C., and it was extruded and drawn with a first roller and simultaneously introduced into a cooling bath set at a temperature of 40° C. and thereby cooled, obtaining an undrawn monofilament 1.8 mm in diameter.
Using the resulting undrawn monofilament, a modeled article with a size of 50 mm×10 mm×5 mm was obtained using a 3D printing device the nozzle temperature of which was set at 200° C. For the modeled article obtained, evaluation was performed with respect to the above-mentioned (7) to (9).
[Evaluation Result]
As shown in Table 1, a material capable of creating a modeled article that develops little warpage and excels in surface polishability was obtained successfully by bringing the mixing ratios of the polylactic acid resin (A), the styrene-based resin (B1), and/or the thermoplastic resin (B2) the glass transition temperature of which is 20° C. or lower into the ranges of the present invention. The modeled articles in which the materials for modeling of Examples 1 to 8 were used were smaller in the amount (degree) of warpage and superior in warpage resistance as compared with the modeled articles produced using the styrene-based resin (B1; of Comparative Example 1, the ABS resin (B2-6) of Comparative Example 2, and the alloy (B2-7) of ABS resin and PC resin of Comparative Example 3.
As shown in Comparative Example 4, a modeled article using a material for modeling composed of only the polylactic acid resin (A) was remarkably low in polishability and its practical use was difficult.
Similarly, as shown in Comparative Example 5, also when the polylactic acid resin (A) and the styrene-based resin (B1) were mixed at ratios outside the ranges of the present invention, the polishability of the resulting modeled article was remarkably low and its practical use was difficult.
As shown in Table 1, the materials for modeling of the present invention (Examples 1 to 8) were lower in melt viscosity than the materials for modeling formed from the styrene-based resin (A), (Comparative Example 1), the ABS resin (Comparative Example 2), and the alloy of ABS resin and PC resin (Comparative Example 3). Therefore, these materials can be molded at lower temperatures and can reduce electric power consumption during molding with a 3D printing device and can reduce the amount of gas emitted from the resin, and thus, they can contribute to safety and health.
The materials for modeling of Comparative Examples 1 to 3 are all high in melt viscosity and higher temperatures are required for molding them.

Examples 9 to 19, Comparative Examples 6 to 8

Feed materials (a polylactic acid resin (A), a thermoplastic resin (B2) and/or a plasticizer (B3), an epoxy group-containing compound (C)) were mixed at the ratios given in Table 2 and melt-kneaded under conditions including a set temperature of 200° C., a screw rotation speed of 150 rpm, and a discharge rate of 30 kg/h using a vented twin screw extruder having a screw diameter of 30 mm, obtaining a pelletized material for modeling with a pelletizer. The resulting material for modeling was dried with hot air at a temperature of 70° C. for 5 hours and then was fed into a single screw melt-extruder the temperature of which was set at 200° C., and it was extruded and drawn with a first roller and simultaneously introduced into a cooling bath set at a temperature of 40° C. and thereby cooled, obtaining an undrawn monofilament 1.8 mm in diameter. Subsequently, from the resulting undrawn monofilament, a modeled article with a size of 50 mm×10 mm×5 mm was obtained using a 3D printing device the nozzle temperature of which was set at 200° C. For the modeled article obtained, evaluation was performed with respect to the above-mentioned (7) to (9). Moreover, the pelletized material for modeling was injection molded at a cylinder temperature of 200° C. and a mold temperature of 40° C., obtaining a specimen. Using the specimen obtained, evaluation was performed with respect to the above-mentioned (6). The results are shown in Table 2 (Examples 9 to 19, Comparative Examples 6 to 8).

Comparative Example 9

Feed materials (a polylactic acid resin, nylon 6) were mixed at the ratios given in Table 2 and melt-kneaded under conditions including a set temperature of 240° C., a screw rotation speed of 150 rpm, and a discharge rate of 30 kg/h using a vented twin screw extruder having a screw diameter of 30 mm, obtaining a pelletized material for modeling with a pelletizer. The resulting material for modeling was dried with hot air at a temperature of 70° C. for 5 hours and then was fed into a single screw melt-extruder the temperature of which was set at 240° C., and it was extruded and drawn with a first roller and simultaneously introduced into a cooling bath set at a temperature of 40° C. and thereby cooled, obtaining an undrawn monofilament 1.8 mm in diameter. Subsequently, from the resulting undrawn monofilament, a modeled article with a size of 50 mm×10 mm×5 mm was obtained using a 3D printing device the nozzle temperature of which was set at 240° C. For the modeled article obtained, evaluation was performed with respect to the above-mentioned (7) to (9). Moreover, the pelletized material for modeling was injection molded at a cylinder temperature of 240° C. and a mold temperature of 40° C., obtaining a specimen. Using the specimen obtained, evaluation was performed with respect to the above-mentioned (6). The results are shown in Table 2 (Comparative Example 9).

TABLE 1

|  |  |  | Example | | | | | | | | Comparative Example | | | | |
|---|---|---|---|---|---|---|---|---|---|---|---|---|---|---|---|
|  |  |  | 1 | 2 | 3 | 4 | 5 | 6 | 7 | 8 | 1 | 2 | 3 | 4 | 5 |
| Polylactic acid resin (A) | (A-1) | part by weight |  | 100 |  |  |  |  |  |  |  |  |  |  |  |
|  | (A-2) | part by weight |  |  | 100 |  |  |  |  |  |  |  |  |  |  |
|  | (A-3) | part by weight | 100 |  |  | 100 |  | 100 | 100 |  |  |  |  |  |  |
|  | (A-4) | part by weight |  |  |  |  | 100 |  |  | 100 |  |  |  | 100 | 100 |
| Styrene-based resin (B1) | (B1) | part by weight | 900 | 233 | 233 | 233 | 233 | 100 | 163 | 42 | 100 |  |  |  | 5 |
| Thermoplastic resin (B2) | (B2-1) | part by weight |  |  |  |  |  |  | 66 | 29 |  |  |  |  |  |
|  | (B2-6) | part by weight |  |  |  |  |  |  |  |  |  | 100 |  |  |  |
|  | (B2-7) | part by weight |  |  |  |  |  |  |  |  |  |  | 100 |  |  |
| Degree of warpage | | mm | 2.1 | 1.7 | 1.0 | 1.7 | 1.0 | 1.3 | 1.8 | 0.8 | 3.4 | 3.3 | 3.7 | 0.0 | 0.1 |
| Polishability | | — | + | + | + | + | + | + | + | + | + | + | + | − | − |
| Bleeding out property | | — | ++ | ++ | ++ | ++ | ++ | ++ | ++ | ++ | ++ | ++ | ++ | ++ | ++ |
| MFR (220° C. · 98N) | | g/10 min | 83 | 81 | 75 | 158 | 82 | 280 | 85 | 79 | 70 | 48 | 7 | 98 | 95 |
| Deflection temperature under load (0.45 MPa) | | ° C. | 93 | 92 | 92 | 92 | 92 | 75 | 83 | 58 | 98 | 94 | 117 | 56 | 56 |
| Charpy impact strength | | kJ/m$^2$ | 1 | 2 | 2 | 1 | 2 | 1 | 15 | 10 | 2 | 10 | 89 | 1 | 1 |

TABLE 2

|  |  |  | Example | | | | | | | | | | | Comparative Example | | | |
|---|---|---|---|---|---|---|---|---|---|---|---|---|---|---|---|---|---|
|  |  |  | 9 | 1 0 | 11 | 12 | 1 3 | 14 | 1.5 | 1 6 | 17 | 13 | 19 | 6 | 7 | 8 | 9 |
| Polylactic acid resin (A) | (A-5) | part by weight | 100 | 100 | 100 | 100 | 100 | 100 | 100 | 100 | 100 | 100 | 100 | 100 | 100 | 100 | 100 |
| Thermoplastic resin (B2) | (B2-2) | part by weight | 5 | 150 | 400 | 150 |  |  |  |  |  |  | 125 |  | 500 |  |  |
|  | (B2-3) | part by weight |  |  |  |  | 150 |  |  |  |  |  |  |  |  |  |  |
|  | (B2-4) | part by weight |  |  |  |  |  | 150 |  |  |  |  |  |  |  |  |  |
|  | (B2-5) | part by weight |  |  |  |  |  |  | 10 |  |  |  |  |  |  |  |  |
|  | (B2-8) | part by weight |  |  |  |  |  |  |  |  |  |  |  |  |  |  | 150 |

TABLE 2-continued

| | | | Example | | | | | | | | | | | | Comparative Example | | | |
|---|---|---|---|---|---|---|---|---|---|---|---|---|---|---|---|---|---|---|
| | | | 9 | 10 | 11 | 12 | 13 | 14 | 15 | 16 | 17 | 18 | 19 | 6 | 7 | 8 | 9 |
| Plasticizer (B3) | (B3-1) | part by weight | | | | | | | | 5 | 25 | 30 | 13 | | | 100 | |
| Epoxy group-containing compound (C) | (C)-1 | part by weight | | | | 0.3 | | | | | | | | | | | |
| Degree of warpage | | mm | 0.0 | 0.0 | 0.0 | 0.0 | 0.0 | 0.0 | 0.0 | 0.0 | 0.0 | 0.0 | 0.0 | 0 | 0 | 0 | 5 |
| Polishability | | — | + | + | + | + | + | + | + | + | + | + | + | − | −− | − | + |
| Bleeding out property | | — | ++ | ++ | ++ | ++ | ++ | ++ | ++ | + | + | + | ++ | ++ | ++ | − | ++ |
| Charpy impact strength | | kJ/m² | 2.5 | 100 | NB | 100 | 95 | 95 | 95 | 2.5 | NB | NB | NB | 1.5 | NB | NB | 60 |

As shown in Examples 9 to 15, it is revealed that excellent warpage resistance and impact resistance are attained by bringing the mixing ratios of a polylactic acid resin and a thermoplastic resin into the ranges of the present invention. As shown in Examples 16 to 18, it is revealed that excellent warpage resistance and softness are attained by bringing the mixing ratios of a polylactic acid resin and a plasticizer into the ranges of the present invention. As shown in Example 19, it is revealed that excellent warpage resistance and impact resistance are attained by bringing the mixing ratios of a polylactic acid resin, a thermoplastic resin, and a plasticizer into the ranges of the present invention. In Table 2, the case where a pellet did not break in a prescribed test method is denoted as NB.

On the other hand, as shown in Comparative Examples 6 to 9, it is revealed that polishability or bleeding out property is poor when the mixing ratio of a polylactic acid resin, a thermoplastic resin, or a plasticizer is outside the range of the present invention.

The invention claimed is:

1. A material for fused deposition modeling type three-dimensional modeling which comprises a mixture obtained by blending together with 100 parts by weight of a polylactic acid resin (A) and an epoxy group-containing compound (C) one or more of the following components:
   (i) 10 to 900 parts by weight of a styrene-based resin (B1) obtained by copolymerizing an aromatic vinyl-based monomer (b1) and a vinyl cyanide-based monomer (b2), and/or
   (ii) 5 to 400 parts by weight of a thermoplastic resin (B2) the glass transition temperature of which is 20° C. or lower, and/or
   (iii) 5 to 30 parts by weight of a plasticizer (B3),
   wherein the styrene-based resin (B1) is excluded from the epoxy group-containing compound (C).

2. The material for fused deposition modeling type three-dimensional modeling according to claim 1, wherein the optical purity of the polylactic acid resin (A) is 97% or less.

3. The material for fused deposition modeling type three-dimensional modeling according to claim 1, wherein the thermoplastic resin (B2) comprises a copolymerized polyester resin.

4. The material for fused deposition modeling type three-dimensional modeling according to claim 1, wherein the material comprises the styrene-based resin (B1) and the thermoplastic resin (B2) having a glass transition temperature of 20° C. or lower and the thermoplastic resin (B2) comprises a thermoplastic elastomer.

5. The material for fused deposition modeling type three-dimensional modeling according to claim 1, wherein the plasticizer (B3) comprises an ester-based plasticizer and/or a polyalkylene glycol-based plasticizer.

6. A filament, particle or pellet for a fused deposition modeling type 3D printing device obtained by molding the material for fused deposition modeling type three-dimensional modeling according to claim 1.

7. A modeled article obtained by modeling the filament, particle or pellet for a fused deposition modeling type 3D printing device according to claim 6.

8. A method for producing a filament, particle or pellet for a fused deposition modeling type 3D printing device including a step of obtaining a filament, particle or pellet by molding the material according to claim 1.

9. A method for producing a modeled article including a step of obtaining a modeled article using the filament, particle or pellet according to claim 6 in a fused deposition modeling type 3D printing device.

10. The material for fused deposition modeling type three-dimensional modeling according to claim 1, wherein the mixture includes the styrene-based resin (B1) and the thermoplastic resin (B2).

11. The material for fused deposition modeling type three-dimensional modeling according to claim 1, wherein the mixture includes the thermoplastic resin (B2) and the plasticizer (B3).

* * * * *